Patented Mar. 16, 1948

2,437,683

UNITED STATES PATENT OFFICE 2,437,683

PYRIMIDINE COMPOUNDS AND METHOD OF PRODUCING SAME

Francis Henry Swinden Curd, Clifford Gordon Raison, and Francis Leslie Rose, Blackley, Manchester, England, assignors to Imperial Chemical Industries Limited, a corporation of Great Britain No Drawing. Application April 5, 1945, Serial No. 586,820. In Great Britain June 11, 1943

16 Claims. (Cl. 260—251)

This invention relates to new pyrimidine compounds and to processes for manufacturing the same and is a continuation-in-part of our copending application Serial No. 537,536, filed May 26, 1944. The said new compounds, which will be more closely defined hereinafter, may be described broadly as pyrimidines bearing in the 2- or 4-position an arylamino group, and in the 4- or 2-position a strongly basic substituent derived from a diamine which is at least in part aliphatic or alicyclic, and optionally bearing other substituents in the 5- and 6-positions. They are useful as chemotherapeutic agents and have properties such as make them particularly valuable as antimalarial agents.

It is an object of this invention to provide new pyrimidine compounds. A further object is to provide new chemotherapeutic agents. A further object is to provide new and valuable antimalarial agents. Another object is to provide processes for manufacturing new pyrimidine compounds. A further object is to provide processes for making new antimalarial agents. Further objects will appear hereinafter as the description proceeds. These and other objects are achieved by the following invention.

The said new compounds are pyrimidine derivatives of the formula

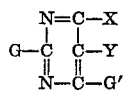

wherein X is hydrogen or a hydrocarbon radical, Y is hydrogen or a simple neutral substituent such, for example, as a hydrocarbon radical, a halogen atom, an alkoxy or aryloxy or alkylmercapto group, or a cyano group, and also X and Y may be joined together to form an alkylene chain, and of the groups G and G', one is an arylamino group which may be unsubstituted or may bear one or more simple non-acidic substituents such, for example, as halogen atoms, nitro groups, hydrocarbon radicals (which themselves may optionally bear substituents and which may be attached to the arylamino group directly or through an oxygen or sulphur atom or through an imino, sulphonyl or carbonyl group), cyano groups or esterified carboxyl groups, and the other is a group of the form NR"—A—NRR' wherein R" is hydrogen or an alkyl or simply substituted alkyl group, for example an alkoxyalkyl or dialkylaminoalkyl group, A is a linking group which is aliphatic or alicyclic or aliphatic-carbocyclic and may be substituted, for example, by hydrocarbon radicals, hydroxy or alkoxy groups or dialkylaminoalkyl groups and, where A or part of A is an aliphatic chain, it may be interrupted by oxygen or sulphur atoms or imino groups, and NRR' is a strongly basic amino or substituted amino group such as alkylamino or dialkylamino or piperidino or other strongly basic nitrogen-containing heterocyclic group.

We make the said new compounds by a process comprising the interaction of a diamine

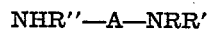

with an appropriate 2- or 4-arylaminopyrimidine bearing the groups Y and X in the 5- and 6-positions respectively and in the 4- or 2-position a labile group such as a halogen atom or a hydrocarbon radical which is attached by means of an ether or thioether linkage, for example, an alkoxy, aryloxy or alkylmercapto group.

It will be appreciated that in the particular case where the diamine is of the type

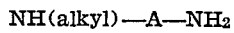

it is necessary first to protect the free amino group, as by acylation, and then to remove the protecting group after the condensation with the arylaminopyrimidine compound has been effected. This procedure is, in fact, a particular embodiment of the modified process hereinafter to be described.

The reaction is conveniently brought about by heating the reagents together, optionally in presence of a solvent or diluent. If desired, the arylaminopyrimidine compound or the diamine may be used in the form of a salt, such as the hydrochloride or acetate. Also if desired the reaction may be carried out in presence of an acid-binding agent such as sodium hydroxide.

The reagents are conveniently, but not necessarily, used in approximately stoichiometric proportions. Actually we prefer to use about 1.25 molecular proportions of the diamine, but the proportions are not critical and if desired a large excess of the diamine may be used so that it functions as a solvent or diluent.

The 2- or 4-halogenopyrimidine compounds used as starting materials may be made by reaction of a halogenating agent such as phosphorus oxychloride or oxybromide with the products of interaction of appropriate arylamines and 4- or 2-alkylmercapto-2- or 4-hydroxypyrimidines (see our copending application Serial No. 552,383, filed September 1, 1944, now Patent No. 2,433,440, issued December 30, 1947). The alternative starting materials containing ether or thioether groups can readily be made by interaction of the halogeno-derivatives with the appropriate hydroxy or mercapto compounds or with alkali metal derivatives of such compounds.

As examples of suitable arylaminopyrimidine intermediates there may be mentioned 4-chloro-2-anilino-6-methylpyrimidine,
4-chloro-2-(4'-chloroanilino)-pyrimidine,
4 - chloro - 2 - (4' - chloroanilino) - 6 - methylpyrimidine,
4-chloro-2-(4'-methylanilino)-pyrimidine,
4-chloro-2-(4'-methylanilino)-6 - methylpyrimidine,
4-chloro-2-(4' - methoxyanilino) - 6 - methylpyrimidine,
4 - chloro - 2 - (4' - methylmercaptoanilino) - 6 - methylpyrimidine,
4-chloro-2-(3'-chloroanilino)- 6 - methylpyrimidine,
4-chloro-2-(2'-chloroanilino) - 6 - methylpyrimidine,
4-chloro-2-(3'-methylanilino) - 6 - methylpyrimidine,
4-chloro-2-(2'-methylanilino) - 6 - methylpyrimidine,
4-chloro-2-(2':4'-dichloroanilino) - 6 - methylpyrimidine,
4-chloro-2-(3':4'-dichloroanilino) - 6 - methylpyrimidine,
4-chloro-2-(2':5'-dichloroanilino) - 6 - methylpyrimidine,
4-chloro-2 - (2' - methyl - 4' - chloroanilino) - 6 - methylpyrimidine,
4-chloro - 2 - (3' - chloro - 4' - methylanilino) -6- methylpyrimidine,
4-chloro-2-(3':4'-dimethylanilino) - 6 - methylpyrimidine,
4-chloro-2-(3':5'-dimethylanilino) - 6 - methylpyrimidine,
4-chloro-2-(2'-methoxyanilino) - 6 - methylpyrimidine,
4-chloro-2-(3':5'-dibromoanilino) - 6 - methylpyrimidine,
4-chloro-2 - (4' - dimethylamino - anilino) - 6 - methylpyrimidine,
4-chloro-2-(4' - chloroanilino) - 5 - bromo - 6 - methylpyrimidine,
4-chloro-2-(4'-chloroanilino) - 6 - phenylpyrimidine,
4-chloro-2-(4'-chloroanilino) - 5 - phenylpyrimidine,
4-chloro-2-(4'-methoxyanilino) - 5 - phenylpyrimidine,
4-chloro-2-(4'-chloroanilino) - 5 - methylpyrimidine,
4-chloro-2-(4'-chloroanilino) - 5:6 - dimethylpyrimidine,
4-chloro-2 - (4' - chloroanilino) - 5 - ethyl - 6 - methylpyrimidine,
4-chloro-2-(2'-naphthylamino) - 6 - methylpyrimidine,
4-chloro-2-(6'-bromo- 2' - naphthylamino) - 6 - methylpyrimidine,
4-chloro-2-(6'methoxy-2' - naphthylamino - 6 - methylpyrimidine,
4-chloro-2-(1'-naphthylamino) - 6 - methylpyrimidine,
4-chloro-2-(4'-chloro - 1' - naphthylamino - 6 - methylpyrimidine,
4-chloro-2-(4'-ethoxyanilino) - 6 - methylpyrimidine,
4-chloro-2-(4'-bromoanilino) - 6 - methylpyrimidine,
4-chloro-2-(4'- n - butylanilino) - 6 - methylpyrimidine,
4-chloro-2-(4'-carbomethoxyanilino) - 6 - methylpyrimidine,
4-chloro-2-(4'-phenylanilino) - 6 - methylpyrimidine,
4-chloro-2-(4'-nitroanilino) - 6 - methylpyrimidine,
4-chloro-2-(4'-cyanoanilino) - 6 - methylpyrimidine,
4-chloro-2-(4'-chloroanilino) - 5 - phenoxypyrimidine,
4-chloro-2-(4' - chloroanilino) - 5 - benzyl - 6 - methylpyrimidine, and
4-chloro-2-(4'- chloroanilino) - 5:6:7:8 - tetrahydroquinazoline.

Also the 2-chloro-4-arylamino isomers of the above compounds may be used, and likewise the corresponding 4-arylamino-2 - bromo-, 2-phenoxy-, 2-ethoxy-, 2-methyl-mercapto-, 2-ethylmercapto- and 2 - phenylmercapto-compounds and their isomers in which the 2- and 4-substituents are transposed.

As examples of suitable diamines there may be mentioned, ethylenediamine, 2-dimethylaminoethylamine, 2 - diethylaminoethylamine, 3 - dimethylaminopropylamine, 3-diethylaminopropylamine, 4-diethylaminobutylamine, 4 - diethylamino-1-methylbutylamine, 3-diethylamino -1:2-dimethylpropylamine, 3-diethylamino - 2 - hydroxypropylamine, 2 - methylaminoethylamine, 3 - butylaminopropylamine, 3 - diethylaminoethoxypropylamine, 3-diethylaminoethylmercaptopropylamine, 5-diethylamino-1-aminopentane, 2-pyrrolidinoethylamine, 1:3-bis-diethylamino - 2-aminopropane, N-ethyl-N - β - diethylaminoethyl-ethylenediamine, 2 - piperidinoethylamine, 3 - piperidinopropylamine, p - dimethylamino - ethoxyaniline, p-diethylaminoethoxyaniline, p-diethylaminoethylmercaptoaniline, 3 - diethyl - amino-2:2'-dimethylpropylamine, 3-di-n-butylaminopropylamine, N-methyl-N-β-diethylaminoethylpropylenediamine and β - piperidino - α - methyl-ethylamine.

A further feature of the invention is a modified process wherein the basic substituent NR''—A—NRR' is introduced by stages. Thus the arylaminopyrimidine compound carrying a labile group in the 2- or 4-position is brought into reaction with an amino-compound of the form NHR''—A'—B, where A' represents either the whole or a part of the linking group A defined above and where B stands for a reactive group which is then converted by known methods into the group NRR' or into a group A''—NRR' such that A' and A'' together constitute the linking group A. For example, the group B may be a hydroxy group or a derivative thereof which is, or is readily convertible to, a reactive ester thereof, such as a halide, this then being brought into reaction with an amine NHRR' or an amino-substituted amine NH₂—A'''—NRR' or a hydroxy- or mercapto-substituted amine HO—A'''—NRR' or HS—A'''—NRR' (or an alkali metal derivative of such a hydroxy or mercapto compound) such that A'—NH—A''', A'—OA''' or A'—S—A''' constitutes the linking group A previously mentioned. Another alternative is to bring the labile group in the 2- or 4-position of the arylaminopyrimidine compound into reaction with an acylated diamine NHR''—A'—NHAc and then to hydrolyse off the acyl group. Further, if desired, the free amino group so generated may be modified, as by alkylation, conversion to a heterocyclic group such as piperidino or by bringing it into reaction with a halogeno-substituted amine Hal—A'''—

NRR' such that A'—NH—A''' constitutes the linking group A.

These 2- or 4-arylaminopyrimidines carrying a basic substituent in the 4- or 2-position and optionally bearing other substituents in the 5- and 6-positions are new compounds. They are strongly basic colourless or pale yellow viscous oils or colourless crystalline solids. When the bases are oils, the picrates, which are crystalline, may be used for purposes of characterisation. The bases form colourless salts with mineral and organic acids. The salts with mineral acids such as hydrogen halides, sulphuric and phosphoric acids or with lower organic acids such as acetic, lactic, tartaric and lower alkanesulphonic acids (e. g. methanesulphonic acid) are water-soluble. The salts with acids of higher molecular weight such as methylene bis-2:3-hydroxynaphthoic acid and methylene bis-salicylic acid are more sparingly soluble in water.

The following examples illustrate, but do not limit, the invention. The parts are by weight.

*Example 1*

25.4 parts of 4-chloro-2-p-chloroanilino-6-methylpyrimidine and 14.25 parts of diethylaminoethylamine are stirred and heated together at 120°–130° C. for 6 hours. The resulting melt is dissolved in 500 parts of hot dilute hydrochloric acid. After cooling the solution is basified with caustic soda solution and the base which is liberated as an oil is extracted with chloroform. The chloroform extract is shaken twice with 250 parts of 5% aqueous acetic acid. The aqueous extracts are combined, and basified with caustic soda solution. The liberated base is extracted with chloroform and the chloroform extract is dried over potassium carbonate and evaporated. The residual oil is then distilled in vacuo. 4-β-diethylaminoethylamino - 2 - p-chloroanilino-6-methyl-pyrimidine distills over at 224°–226° C./0.03 mm. It forms a dipicrate which crystallises from β-ethoxyethanol in thick yellow prisms, M. P. 219–220° C.

The base can be converted into its dihydrochloride by dissolving it in an excess of 2-normal hydrochloric acid and evaporating the resulting solution in vacuo at 50°–55° C. The residue is dried and crystallised from a mixture of ethyl alcohol and ethyl acetate and finally from ethyl alcohol. 4- β -diethylaminoethylamino -2-p-chloroanilino-6-methylpyrimidine · dihydrochloride is thus obtained, M. P. 270–271° C. (decomp.).

In a similar manner from 4-chloro-2-p-chloroanilino-6-methylpyrimidine and 1-diethylamino-3-aminopropane there is obtained 4-γ-diethylaminopropylamino-2-p - chloroanilino-6-methylpyrimidine (B. P. 225° C./0.4 mm.). The picrate has melting point 219° C. after recrystallisation from β-ethoxyethanol. The corresponding dihydrochloride melts at 252°–254° C. after crystallisation from ethanol. It is readily soluble in water.

Likewise from 4-chloro-2-p-chloroanilino-6-methylpyrimidine and 1-diethylamino-4-aminopentane, 4 - δ - diethylamino - α - methylbutylamino-2 - p-chloroanilino - 6 - methylpyrimidine is obtained as a clear yellow viscous oil B. P. 210° C./0.9 mm. The picrate crystallises from a mixture of β-ethoxyethanol and ethanol in yellow needles, M. P. 168°–170° C. The dihydrochloride melts at 234°–237° C. after crystallisation from a mixture of ethanol and ethyl acetate, from which it separates in colourless needles.

In a corresponding manner from 4-chloro-2-p-chloroanilino-6-methylpyrimidine and 1-diethylamino-4-aminobutane, 4-δ-diethylaminobutylamino-2-p-chloroanilino-6-methylpyrimidine is obtained. The dihydrochloride melts at 245°–247° C. after crystallisation from ethanol. It forms colourless needles.

Likewise from 4-chloro-2-p-chloroanilino-6-methylpyrimidine and 1-dimethylamino-3-aminopropane there is obtained 4-γ-dimethylaminopropylamino-2-p - chloroanilino-6-methylpyrimidine, the dihydrochloride of which, crystallised from a mixture of ethanol and ethyl acetate, has M. P. 231°–234° C.

Similarly by interaction of 4-chloro-2-p-chloroanilino-6-methylpyrimidine with 1-piperidino-3-aminopropane there is obtained 4-γ-piperidinopropylamino-2-p-chloroanilino - 6-methylpyrimidine, the dihydrochloride of which melts at 289°–292° C.

By interaction of 4-chloro-2-p-chloroanilino-6-methylpyrimidine and p-(β-diethylaminoethoxy)-aniline there is formed 4-p-(β-diethylaminoethoxy)-anilino - 2 - p - chloroanilino-6-methylpyrimidine which after crystallisation from ethanol has M. P. 150°–152° C.

Again by interaction of 4-chloro-2-p-chloroanilino-6-methylpyrimidine with 1-n-butylamino-3-aminopropane there is obtained 4-γ-n-butylaminopropylamino - 2 - p - chloroanilino-6-methylpyrimidine, the dehydrochloride of which melts with decomposition at 232°–235° C.

*Example 2*

12.7 parts of 4-chloro-2-p-chloroanilino-6-methylpyrimidine, 5.1 parts of 2-dimethylaminoethylamine and 3.75 parts of glacial acetic acid are stirred and heated together for 3 hours at 100° C. The resulting reaction mixture is dissolved in 250 parts of hot dilute hydrochloric acid. After filtering from a little undissolved matter the solution is basified with caustic soda solution and the precipitated oil is extracted with chloroform. The chloroform extract is shaken twice with 100 parts of 5% acetic acid, the aqueous extracts combined and basified with caustic soda solution. The base is separated off and dissolved in hot 2-normal hydrochloric acid. On cooling, the dihydrochloride of 4-β-dimethylaminoethylamino - 2 - p - chloroanilino-6-methylpyrimidine crystallises out. It is filtered off and washed with acetone. By recrystallisation from ethanol it is obtained as colourless needles, melting point 213–215° C.

*Example 3*

15.5 parts of 2-p-chloroanilino-4-phenoxy-6-methylpyrimidine (M. P. 126°–127° C. made by heating 4-chloro-2-p-chloroanilino-6-methylpyrimidine with sodium phenate in phenol) and 7.25 parts of β-diethylaminoethylamine are heated together in 45 parts of phenol for 8 hours at 120°–130° C., with stirring. After cooling somewhat, the still molten reaction mixture is poured into an excess of dilute caustic soda and the oil which separates out is extracted with chloroform. The chloroform extract is shaken twice with 100 parts of 5% aqueous acetic acid and the aqueous extracts are combined and basified with caustic soda solution. The oil is separated off and dissolved in 100 parts of 7% hydrochloric acid. This solution is evaporated to dryness under diminished pressure at 50°–60° C. and the residue is crystallised from ethanol whereby 2-p-chloroanilino-4-β-diethylaminoethylamino-6-methylpyrimidine dihydrochloride is obtained; it has M. P. 269°–270° C.

Working in the same way with 10.4 parts of the dihydrochloride, or 8.5 parts of the monohydrochloride, of β-diethylaminoethylamine instead of the 7.25 parts of the free base used in the process just described, better yields of 2-p-chloroanilino-4-β-diethylaminoethylamino-6-methylpyrimidine dihydrochloride are obtained.

By working in the way described above, but using instead of the 7.25 parts of β-diethylaminoethylamine, 8.1 parts of γ-diethylaminopropylamine, there is obtained 2-p-chloroanilino-4-γ-diethylaminopropylamino-6-methylpyrimidine dihydrochloride of M. P. 249°–250° C.

Again by using 11.3 parts of the dihydrochloride or 9.3 parts of the monohydrochloride instead of the 8.1 parts of the free γ-diethylaminopropylamine and working in the manner just described improved yields of 2-p-chloroanilino-4-γ-diethylaminopropylamino-6-methylpyrimidine dihydrochloride are obtained.

Example 4

25.4 parts of 4-chloro-2-p-chloroanilino-6-methylpyrimidine and 12.2 parts of ethanolamine are stirred and heated together at 120°–130° C. for 10 hours. The resulting melt is heated with 300 parts of water and the solid thereby obtained is filtered off. It is then stirred with dilute caustic soda solution, again filtered and washed well with water. By crystallisation from methanol 2-p-chloroanilino-4-β-hydroxyethylamino-6-methyl-pyrimidine is obtained, M. P. 157°–158° C. It forms a hydrochloride, M. P. 218°–219° C. which is sparingly soluble in water.

14 parts of 2-p-chloroanilino-4-β-hydroxyethylamino-6-methylpyrimidine and 42 parts of phosphorus oxychloride are refluxed together for 15 minutes. The excess of phosphorus oxychloride is then removed by distillation in vacuo at 50°–60° C. The residue is added to crushed ice and the mixture is stirred and then allowed to stand for 2 hours. The product which separates is then filtered off and dissolved in ethanol. Concentrated hydrochloric acid is added to the solution whereupon 2-p-chloroanilino-4-β-chloroethylamino-6-methylpyrimidine hydrochloride separates in flat needles, M. P. 290°–291° C.

11.1 parts of 2-p-chloroanilino-4-β-chloroethylamino-6-methylpyrimidine hydrochloride and 30 parts of diethylamine are heated in a closed vessel at 140° C. for 8 hours. The vessel is then opened and any excess of dimethylamine is distilled off by heating the contents to 100° C. for 2 hours at atmospheric pressure. The residue is dissolved in 250 parts of hot dilute hydrochloric acid. After cooling, the solution is basified with caustic soda solution and the oily base which is liberated is extracted with chloroform. The chloroform solution is shaken twice with 150 parts of 5% acetic acid solution. The aqueous extracts are combined and basified with caustic soda solution. The liberated base is extracted with chloroform and the chloroform extract is dried over anhydrous potassium carbonate. The chloroform is distilled off and the residual oil is distilled in vacuo. The fraction of B. P. 215°–225° C./0.01–0.15 mm. is collected and consists of 4-β-diethylaminoethylamino-2-p-chloroanilino-6-methyl-pyrimidine. The picrate of the base melts at 217°–219° C. after crystallisation from β-ethoxyethanol.

Example 5

11.5 parts of 4-chloro-2-(4'-dimethylaminoanilino)-6-methylpyrimidine and 7.1 parts of γ-diethylaminopropylamine are heated together for 8 hours at 120°–130° C. After cooling, the reaction mixture is dissolved in dilute hydrochloric acid and the solution is basified with caustic soda solution. The base, which is liberated as an oil, is extracted with chloroform. The chloroform solution is extracted twice with 300 parts of 5% acetic acid and the acid extracts are combined and basified with caustic soda solution. The base is extracted with chloroform, the solution is dried, and the chloroform is distilled off in vacuo. The residue, which is 4-γ-diethylaminopropylamino-2-(4'-dimethylamino-anilino)-6-methylpyrimidine, is dissolved in hydrobromic acid and acetic is added, whereupon the trihydrobromide is precipitated. It is filtered off, washed with acetone, dried and crystallised from ethanol. It has M. P. 256°–258° C.

Example 6

32.3 parts of 4-chloro-2-β-naphthylamino-6-methylpyrimidine and 17.4 parts of diethylaminoethylamine are stirred and heated together at 120°–130° C. for 10 hours. The resulting melt is dissolved in 600 parts of dilute hydrochloric acid. After basification with caustic soda the base, which is liberated as an oil, is extracted with ether. The ether extract is shaken twice with 250 parts of 5% aqueous acetic acid, the aqueous extracts are combined and basified with caustic soda solution. The base which is liberated is separated off and stirred with 300 parts of 2-normal hydrochloric acid. The hydrochloride which separates out is filtered off, washed with acetone and dried at 60–65° C. It is purified by crystallisation from ethanol. 4-β-diethylaminoethylamino-2-β-naphthylamino-6-methylpyrimidine dihydrochloride is thus obtained as colourless needles, M. P. 252–254° C. (decomp.).

In a corresponding manner from 4-chloro-2-β-naphthylamino-6-methylpyrimidine and 1-diethylamino-3-aminopropane the 4-γ-diethylaminopropylamino-2-β-naphthylamino-6-methylpyrimidine is obtained. The dihydrochloride melts at 259–260° (decomp.) after crystallisation from a mixture of ethanol and ethyl acetate and is readily soluble in water.

Similarly from 4-chloro-2-β-naphthylamino-6-methylpyrimidine and 1-diethylamino-4-aminopentane the 4-δ-diethylamino-α-methylbutylamino-2-β-naphthylamino-6-methylpyrimidine is obtained. The dihydrochloride melts at 268–270° C. (with decomp.), after crystallisation from a mixture of ethanol and ethyl acetate.

Likewise from 4-chloro-2-β-naphthylamino-6-methylpyrimidine and 1-diethylamino-4-aminobutane the 4-δ-diethylaminobutylamino 2-β-naphthylamino-6-methylpyrimidine is obtained. The dihydrochloride melts at 262–263° C. (decomp.) after crystallisation from a mixture of ethanol and ethyl acetate.

Again from 4-chloro-2-β-naphthylamino-6-methylpyrimidine and p-(β-diethylaminoethoxy)-aniline, 4-p-(β-diethylaminoethoxy)-anilino-2-β-naphthylamino-6-methylpyrimidine is obtained. The dihydrochloride crystallised from ethanol, melts at 269–271° C. (decomp.).

Example 7

11.7 parts of 4-chloro-2-(6'-methoxy-2'-naphthylamino)-6-methylpyrimidine and 5.7 parts of β-diethylaminoethylamine are stirred and heated at 120–130° C. for 6½ hours. The resulting melt is dissolved in dilute hydrochloric acid and the solution is basified with caustic soda solution. The oily base which is liberated is extracted with ether. The ether extract is shaken with 250 parts of 5% aqueous acetic acid and the aqueous extract is again basified with caustic soda solution. The liberated oil is separated off and dissolved in 60 parts of 2 N hydrochloric acid. The solution is evaporated to dryness in vacuo at 50–60° C. and the solid residue is stirred with acetone and filtered. The solid is washed with acetone and dried at 60–65° C. It is purified by crystallisation from aqueous ethanol. 4-β-diethylaminoethylamino-2-(6'-methoxy-2'-naphthylamino)-6-methylpyrimidine dihydrochloride is thus obtained as colourless needles, M. P. 228–230° C. (decomp.).

In a similar manner from 4-chloro-2-(6'-bromo-2'-naphthylamino)-6-methylpyrimidine and β-diethylaminoethylamine, 4-β-diethylaminoethylamino-2-(6'-bromo-2'-naphthylamino)-6-methylpyrimidine is obtained. The dihydrochloride forms colourless crystals of M. P. 290° C. (decomp.).

Similarly from 4-chloro-2-(6'-bromo-2'-naphthylamino)-6-methylpyrimidine and γ-diethylaminopropylamine there is obtained 4-γ-diethylaminopropylamino-2-(6'-bromo-2'-naphthylamino)-6-methylpyrimidine, the dihydrochloride of which melts at 259–260° C. (decomp.).

From 4-chloro-2-(6'-bromo-2'-naphthylamino)-6-methylpyrimidine and γ-dimethylaminopropylamine there is obtained 4-γ-dimethylaminopropylamino-2-(6'-bromo-2'-naphthylamino)-6-methylpyrimidine, the dihydrochloride of which melts at 234–236° C. (decomp.).

From 4-chloro-2-(6'-bromo-2'-naphthylamino)-6-methylpyrimidine and β-dimethylaminoethylamine there is obtained 4-β-dimethylaminoethylamino-2-(6'-bromo-2'-naphthylamino)-6-methylpyrimidine, the dihydrochloride of which melts at 276–278° C. (decomp.).

From 4-chloro-2-(6'-bromo-2'-naphthylamino)-6-methylpyrimidine and γ-piperidinopropylamine there is obtained 4-γ-piperidinopropylamino-2-(6'-bromo-2'-naphthylamino)-6-methylpyrimidine, the dihydrochloride of which melts at 256–258° C.

Example 8

9.75 parts of 4-chloro-2-(3'-chloroanilino)-6-methylpyrimidine and 6.25 parts of γ-diethylaminopropylamine are heated together at 120–130° C. with stirring for 8 hours. The reaction mixture is then dissolved in 200 parts of dilute hydrochloric acid, cooled and basified with caustic soda solution. The oily base which is precipitated is extracted with chloroform and this chloroform solution extracted twice with 100 parts of 5% aqueous acetic acid. The acetic acid extracts are combined and basified with caustic soda solution. The liberated base is again extracted with chloroform and the chloroform solution extracted with 2-normal hydrochloric acid (two extraction, using 150 parts and 100 parts). The hydrochloric acid extracts are combined and evaporated in vacuo at 60–65° C. 4-γ-diethylaminopropylamino-2-(3'-chloroanilino)-6-methylpyrimidine dihydrochloride remains as a crystalline solid. After crystallisation from ethanol, it forms colourless needles of M. P. 215–217° C.

In a similar way, from 4-chloro-2-(2'-chloroanilino)-6-methylpyrimidine and γ-diethylaminopropylamine there is obtained 4-γ-diethylaminopropylamino-2-(2'-chloroanilino)-6-methylpyrimidine, the dihydrochloride of which melts at 238°–239° C.

Likewise by interaction of 4-chloro-2-(2'-chloroanilino)-6-methylpyrimidine and β-diethylaminoethylamine, 4-β-diethylaminoethylamino-2-(2'-chloroanilino)-6-methylpyrimidine is obtained. Its dihydrochloride has M. P. 251°–253° C.

Example 9

19 parts of 4-chloro-2-(2':4'-dichloroanilino)-6-methylpyrimidine and 10.8 parts of γ-diethylaminopropylamine are intimately mixed and heated together for 8 hours at 120–130° C. After cooling, the reaction mixture is dissolved in dilute hydrochloric acid. It is then basified with caustic soda solution and the liberated base is extracted with chloroform. The chloroform solution is extracted twice with 250 parts of 5% aqueous acetic acid and the acid extracts are combined and basified with caustic soda solution. The base thus liberated, which is 4-γ-diethylaminopropylamino-2-(2':4'-dichloroanilino)-6-methylpyrimidine, is separated off and purified by distillation under high vacuum. It has B. P. 208–210° C./0.02 mm. and forms a picrate which, after crystallisation from β-ethoxyethanol, melts at 210–211° C.

To form the dihydrochloride the base is dissolved in 2-normal hydrochloric acid and concentrated hydrochloric acid is added whereupon the hydrochloride slowly crystallises out. It may be further purified by dissolving it in water and reprecipitating by addition of concentrated hydrochloric acid. It then melts at 208–210° C.

In a similar manner, from 4-chloro-2-(3':4'-dichloroanilino)-6-methylpyrimidine and γ-diethylaminopropylamine there is obtained 4-γ-diethylaminopropylamino-2-(3':4'-dichloroanilino)-6-methylpyrimidine. Its dihydrochloride has M. P. 237°–239° C.

Also from 4-chloro-2-(2':5'-dichloroanilino)-6-methylpyrimidine and γ-diethylaminopropylamine there is obtained 4-γ-diethylaminopropylamino-2-(2':5'-dichloroanilino)-6-methylpyrimidine of M. P. 98°–100° C. (decomp.). The dihydrochloride melts at 248°–250° C.

Example 10

25 parts of 4-chloro-2-(4'-methoxyanilino)-6-methylpyrimidine and 14 parts of β-diethylaminoethylamine are mixed and heated together at 120–130° C. for 6 hours. After cooling the reaction mixture is dissolved in dilute hydrochloric acid. It is then basified with caustic soda solution and the liberated base is extracted with ether. The ether solution is extracted twice with 200 parts of 5% acetic acid, the acid extracts combined and basified with caustic soda solution. The base is separated off and dissolved in 80 parts of 2-normal hydrochloric acid and the solution evaporated to dryness in vacuo at 50–60° C. The dihydrochloride of 4-β-diethylaminoethylamino-2-(4'-methoxyanilino)-6-methylpyrimidine which remains is purified by crystallisation from ethyl alcohol and then has M. P. 231–232° C.

In a similar way from 4-chloro-2-(2'-methoxyanilino)-6-methylpyrimidine and β-diethylaminoethylamine there is obtained 4-β-diethylaminoethylamino-2-(2'-methoxyanilino)-6- methylpyrimidine, the dihydrochloride of which has M. P. 272°–273° C.

From 4-chloro-2-(4'-methylanilino)-6-methylpyrimidine and β-diethylaminoethylamine there is obtained 4-β-diethylaminoethylamino-2-(4'-methylanilino)-6-methylpyrimidine, the dihydrochloride of which has M. P. 216°–218° C.

From 4-chloro-2-(4'-methylmercapto-anilino)-6-methylpyrimidine and β-diethylaminoethylamino there is obtained 4-β-diethylaminoethylamino-2-(4'-methylmercaptoanilino)-6-methylpyrimidine, the dihydrochloride of which has M. P. 232°–234° C.

From 4-chloro-2-anilino-6-methylpyrimidine and the same diamine there is obtained 4-β-diethylaminoethylamino-2-anilino-6-methylpyrimidine, the dihydrochloride of which has M. P. 264° C. (decomp.).

From 4-chloro-2-(2'-methylanilino)-6-methylpyrimidine and the same diamine there is obtained 4-β-diethylaminoethylamino-2-(2'-methylanilino)-6-methylpyrimidine, the dihydrochloride of which has M. P. 237°–238° C.

From 4-chloro-2-(3'-methylanilino)-6-methylpyrimidine and β-diethylaminoethylamine there is obtained 4-β-diethylaminoethylamino-2-(3'-methylanilino)-6-methylpyrimidine, the dihydrochloride of which has M. P. 272°–274° C.

From 4-chloro-2-(4'-ethoxyanilino)-6-methylpyrimidine and β-diethylaminoethylamine there is obtained 4-β-diethylaminoethylamino-2-(4'-ethoxyanilino)-6-methylpyrimidine, the dihydrochloride of which has M. P. 211-213° C.

From 4-chloro-2-α-naphthylamino-6-methylpyrimidine and β-diethylaminoethylamine there is obtained 4-β-diethylaminoethylamino-2-α-naphthylamino-6-methylpyrimidine, the dihydrochloride of which has M. P. 275-276° C. (decomp.).

From 4-chloro-2-(4'-chloro-1'-naphthylamino)-6-methylpyrimidine and β-diethylaminoethylamine there is obtained 4-β-diethylaminoethylamino-2-(4'-chloro-1'-naphthylamino)-6-methylpyrimidine, the dihydrochloride of which has M. P. 294°–295° C.

*Example 11*

15 parts of 4-chloro-2-(2'-methyl-4'-chloroanilino)-6-methylpyrimidine are heated with 13 parts of γ-dibutylaminopropylamine at 120-130° C. for 8 hours. The reaction mixture is dissolved in dilute hydrochloric acid and basified with caustic soda solution. The liberated base is extracted with chloroform, the solution is dried and the chloroform distilled off in vacuo. The base then remaining is distilled in vacuo. It is 4-γ-dibutylamino-propylamino-2-(2'-methyl-4'-chloroanilino)-6-methylpyrimidine. It has a boiling point of 236° C./0.06 mm. and forms a picrate which, after crystallisation from a mixture of β-ethoxyethanol and ethanol, melts at 157-159° C. To make the dihydrochloride the base is dissolved in 2-normal hydrochloric acid and the solution is evaporated to dryness in vacuo. The residue is crystallised from a mixture of ethyl alcohol and ethyl acetate whereby 4-γ-dibutylaminopropylamino-2-(2'-methyl-4'-chloroanilino)-6-methylpyrimidine dihydrochloride is obtained, M. P. 204-205° C.

In a similar way from 4-chloro-2-(2'-methyl-4'-chloroanilino)-6-methylpyrimidine and γ-diethylaminopropylamine there is obtained 4-γ-diethylaminopropylamino-2-(2'-methyl-4'-chloroanilino)-6-methylpyrimidine, the dihydrochloride of which has M. P. 150°–152° C.

Similarly from 4-chloro-2-(3'-chloro-4'-methylanilino)-6-methylpyrimidine and γ-diethylaminopropylamine there is obtained 4-γ-diethylaminopropylamino-2-(3'-chloro-4'-methylanilino)-6-methylpyrimidine, the dihydrochloride of which has M. P. 230°–232° C.

From γ-diethylaminopropylamine and 4-chloro-2-(3':4'-dimethylanilino)-6-methylpyrimidine there is obtained 4-γ-diethylaminopropylamino-2-(3':4'-dimethylanilino)-6-methylpyrimidine, the dihydrochloride of which has M. P. 222°–224° C.

From the same diamine and the isomeric 4-chloro-2-(3':5'-dimethylanilino)-6-methylpyrimidine there is obtained 4-γ-diethylaminopropylamino-2-(3':5'-dimethylanilino)-6-methylpyrimidine, the dihydrochloride of which has M. P. 306°–308° C.

From the same diamine and 4-chloro-2-(3':5'-dibromoanilino)-6-methylpyrimidine there is obtained 4-γ-diethylaminopropylamino-2-(3':5'-dibromoanilino)-6-methylpyrimidine, the dihydrochloride of which has M. P. 264°–266° C.

From the same diamine and 4-chloro-2-(4'-bromoanilino)-6-methylpyrimidine there is obtained 4-γ-diethylaminopropylamino-2-(4'-bromoanilino)-6-methylpyrimidine, the dihydrochloride of which has M. P. 255°–257° C.

From 4-chloro-2-(4'-butylanilino)-6-methylpyrimidine and γ-diethylaminopropylamine there is obtained 4-γ-diethylaminopropylamino-2-(4'-butylanilino)-6-methylpyrimidine, the dihydrochloride of which has M. P. 188°–190° C.

From 4-chloro-2-(4'-carbomethoxyanilino)-6-methylpyrimidine and γ-diethylaminopropylamine there is obtained 4-γ-diethylaminopropylamino-2-(4'-carbomethoxyanilino)-6-methylpyrimidine, the dihydrochloride of which has M. P. 263°–265° C.

From 4-chloro-2-(4'-phenylanilino)-6-methylpyrimidine and γ-diethylaminopropylamine there is obtained 4-γ-diethylaminopropylamino-2-(4'-phenylanilino)-6-methylpyrimidine, the dihydrochloride of which has M. P. 244°–246° C.

From 4-chloro-2-(4'-nitroanilino)-6-methylpyrimidine and γ-diethylaminopropylamine there is obtained 4-γ-diethylaminopropylamino-2-(4'-nitroanilino)-6-methylpyrimidine, the dihydrochloride of which has M. P. 226°–232° C.

From the same diamine and 4-chloro-2-(4'-cyanoanilino)-6-methylpyrimidine there is obtained 4-γ-diethylaminopropylamino-2-(4'-cyanoanilino)-6-methylpyrimidine, the dihydrochloride of which has M. P. 249–251° C.

*Example 12*

6.3 parts of 2-p-chloroanilino-4-chloro-6-phenylpyrimidine are stirred and heated at 125°–135° C. for 8 hours with 3 parts of β-diethylaminoethylamine. The resulting melt is dissolved in 500 parts of hot dilute hydrochloric acid and basified with caustic soda solution. The base thus liberated is extracted with chloroform and the chloroform extract is evaporated. The oily residue is dissolved in 100 parts of 5% aqueous acetic acid, filtered and the filtrate basified with caustic soda solution. The base which is again liberated is extracted with ether and the ether extract is dried over anhydrous potassium carbonate. After distilling off the ether, the oily residue is dissolved in hot 2-normal hydrochloric acid. On cooling, 2-p-chloroanilino-4-β-diethylaminoethylamino-6-phenylpyrimidine dihydrochloride separates out and is filtered off. After crystallisation from ethanol it has M. P. 277°–279° C. (decomp.).

In a similar way from 2-p-methylanilino-4-chloropyrimidine and β-diethylaminoethylamine there is obtained 2-p-methylanilino-4-β-diethylaminoethylaminopyrimidine, the dihydrochloride of which has M. P. 220°–221° C.

Similarly from 2-p-chloroanilino-4-chloropyrimidine and γ-diethylaminopropylamine there is obtained 2-p-chloroanilino-4-γ-diethylaminopropylaminopyrimidine, the dihydrochloride of which has M. P. 208°–210° C.

From 2-p-chloroanilino-4-chloro-5:6-dimethylpyrimidine and γ-diethylaminopropylamine there is obtained 2-p-chloroanilino-4-γ-diethylaminopropylamino-5:6-dimethylpyrimidine, the dihydrochloride of which has M. P. 277°–279° C. (decomp.).

*Example 13*

10.5 parts of 2-p-chloroanilino-4-chloro-5-ethyl-6-methylpyrimidine and 4.1 parts of β-dimethylaminoethylamine are stirred and heated together at 125°–135° C. for 8 hours. The resulting melt is dissolved in 500 parts of hot dilute hydrochloric acid and basified while still hot with caustic soda solution and the base thus liberated is extracted with chloroform. The chloroform extract is shaken three times with 200 parts of 5% aqueous acetic acid and the acetic acid extracts are combined and basified with caustic soda solution. The liberated base is extracted with chloroform, the chloroform solution is dried over anhydrous potassium carbonate and the chloroform is distilled off. 2-p-chloroanilino-4-β - dimethylaminoethylamino-5-ethyl-6-methylpyrimidine remains as a solid. It may be purified by crystallisation from petroleum ether (B. P. 60°–80° C.) when it melts at 115°–116° C.

To make the dihydrochloride the crude base is dissolved in hot 2-normal hydrochloric acid. On cooling 2-p-chloroanilino-4 - β - dimethylaminoethylamino-5-ethyl - 6 - methylpyrimidine dihydrochloride crystallizes out. It may be purified by recrystallisation from ethanol and then melts at 262° C. with decomposition.

By the reaction of the same chloro compound with β-diethylaminoethylamino, 2-p-chloroanilino-4-β-diethylaminoethylamino - 5 - ethyl - 6 - methylpyrimidine is obtained, M. P. 92°–94° C. after recrystallisation from petroleum ether (B. P. 40°–60° C.). The dihydrochloride, recrystalised from a mixture of ethanol and acetone, has M. P. 258°–260° C.

Similarly by using γ-dimethylaminopropylamine as the diamino, 2-p-chloroanilino-4-γ-dimethylaminopropylamino-5-ethyl - 6 - methylpyrimidine is obtained. After crystallisation from petroleum ether (B. P. 100°–120° C.) it has M. P. 126°–128° C. The dihydrochloride after crystallisation from a mixture of ethanol and acetone has M. P. 244°–246° C.

Further, by interaction of 2-p-chloroanilino-4-chloro-5-ethyl-6-methylpyrimidine and γ-diethylaminopropylamine there is obtained 2-p-chloroanilino-4-γ-diethylaminopropylamino - 5-ethyl-6-methylpyrimidine which on crystallisation from petroleum ether separates in colourless laminae, M. P. 108°–109° C. The dihydrochloride crystallises from ethanol, and then melts at 272°–274° C. with decomposition.

*Example 14*

10.9 parts of 2-p-chloroanilino-4-chloro-5-bromo-6-methylpyrimidine and 5.3 parts of γ-diethylaminopropylamine are stirred and heated together at 125°–135° C. for 8 hours. The resulting melt is dissolved in hot dilute hydrochloric acid. The acid solution is basified with caustic soda solution and the base so liberated is extracted with ether. The ether extract is shaken twice with 100 parts of 5% aqueous acetic acid. The combined acetic acid extracts are basified with caustic soda solution and the liberated base again extracted with ether. After drying over anhydrous potassium carbonate, the ether is distilled off. 2-p-chloroanilino-4-γ-diethylaminopropylamino-5-bromo - 6 - methylpyrimidine remains. This can be purified, if desired, by crystallisation from petroleum ether (B. P. 60°–80° C.) and then has M. P. 94°–96° C.

To form the dihydrochloride the crude base is dissolved in hot 2-normal hydrochloric acid. On cooling 2-p-chloroanilino-4-γ-diethylaminopropylamino-5-bromo-6-methylpyrimidine dihydrochloride is obtained. After crystallisation from ethanol it has M. P. 236°–238° C.

In a similar way from 2-p-chloroanilino-4-chloro-5-phenylpyrimidine and β-diethylaminoethylamine there is obtained 2-p-chloroanilino-4-β-diethylaminoethylamino - 5 - phenylpyrimidine which has M. P. 152°–153° C. Its dihydrochloride has M. P. 264°–266° C. (decomp.).

From 2-p-chloroanilino-4-chloro-5-phenylpyrimidine and γ-diethylaminopropylamine there is obtained 2-p-chloroanilino-4-γ-diethylaminopropylamino-5-phenylpyrimidine of M. P. 155°–156° C. The dihydrochloride melts at 264°–266° C., after softening at 262° C.

From 2-p-methoxyanilino-4-chloro-5-phenylpyrimidine and β-diethylaminoethylamine there is obtained 2-p-methoxyanilino-4-β-diethylaminoethylamino-5-phenylpyrimidine of M. P. 158°–159° C. The dihydrochloride has M. P. 209°–211° C. (decomp.).

From 2-p-chloroanilino - 4 - chloro-pyrimidine and the same diamine there is obtained 2-p-chloroanilino-4-β-diethylaminoethylamino - pyrimidine of M. P. 71°–72° C. The dihydrochloride has M. P. 237°–238° C.

From 2-p-chloroanilino-4-chloro-5-methylpyrimidine and the same diamine there is obtained 2-p-chloroanilino-4-β - diethylaminoethylamino-5-methylpyrimidine of M. P. 106°–108° C. The dihydrochloride has M. P. 269° C. (decomp.).

From 2-p-chloroanilino-4-chloro-5:6-dimethylpyrimidine and β - diethylaminoethylamine there is obtained 2-p-chloroanilino-4-β-diethylaminoethylamino-5:6-dimethylpyrimidine of M. P. 100°–102° C. The dihydrochloride has M. P. 270°–271° C.

From 2-p-chloroanilino-4-chloro-5-phenoxypyrimidine and β-diethylaminoethylamine there is obtained 2-p-chloroanilino-4-β-diethylaminoethylamino-5-phenoxypyrimidine of M. P. 84°–85° C.

*Example 15*

13.2 parts of 2-p-chloroanilino-4-ethoxy-6-methylpyrimidine and 9.84 parts of 3-diethylamino-1-aminopropane monohydrochloride are mixed and heated with stirring at 185°–195° C. for 6 hours. After cooling the reaction mixture is dissolved in warm dilute hydrochloric acid and the resulting solution basified with caustic soda. The base which is liberated is extracted with ether and the ether solution is extracted with 5% acetic acid. The acetic acid extract is basified with caustic soda and the liberated base is extracted with chloroform. The chloroform solution is dried, the chloroform is distilled off and the residue is dissolved in 2-normal hydrochloric acid. The solution is evaporated to dryness in vacuo at 50°–60° C. and the residue, after drying, is crystallised twice from ethanol. There is thus obtained 4-γ-diethylaminopropylamino-2-p-chloroanilino-6-methylpyrimidine dihydrochloride, M. P. 250°–252° C.

*Example 16*

8.6 parts of 2-p-chloroanilino-4-chloro-5-benzyl-6-methylpyrimidine and 3.25 parts of β-diethylaminoethylamine are stirred and heated together at 125°–135° C. for 8 hours. While still hot, the melt is dissolved in 400 parts of dilute hydrochloric acid and the hot solution is basified with caustic soda solution. The base which separates out is filtered off, washed with water and dissolved in 500 parts of 5% aqueous acetic acid. The acid solution is clarified with charcoal and then again made alkaline with caustic soda solution. The base which is precipitated is extracted with chloroform. The chloroform solution is dried and the chloroform is distilled off. The crude 2-p-chloroanilino-4-β-diethylaminoethylamino-5-benzyl-6-methylpyrimidine which remains is crystallised from petroleum ether (B. P. 60°–80° C.) and then has M. P. 114°–115° C.

To make the dihydrochloride the crude base is dissolved in hot 2-normal hydrochloric acid; on cooling the dihydrochloride crystallizes out. It may be purified by recrystallisation from ethanol and then has M. P. 255°–266° C. (decomp.)

In a similar way, from the same chloropyrimidine and γ-diethylaminopropylamine there is obtained 2-p-chloroanilino-4-γ-diethylaminoethylamino-5-benzyl-6-methylpyrimidine of M. P. 104°–105° C. The dihydrochloride has M. P. 274°–276° C.

From the same chloro-pyrimidine and γ-dimethylaminopropylamine there is obtained 2-p-chloroanilino-4-γ-dimethylaminopropylamino-5-benzyl-6-methylpyrimidine of M. P. 112°–114° C.

From 2-p-chloroanilino-4-chloro-5-benzyl-6-methylpyrimidine and 5-diethylamino-2-amino-pentane there is obtained 2-p-chloroanilino-4-δ-diethylamino-α-methylbutylamino-5-benzyl - 6 - methylpyrimidine, the dihydrochloride of which has M. P. 242°–244° C.

*Example 17*

9.8 parts of 2-p-chloroanilino-4-chloro-5:6:7:8-tetrahydroquinazoline and 4.83 parts of β-diethylaminoethylamine are stirred and heated together at 125°–135° C. for 8 hours. After cooling, the reaction mixture is dissolved in dilute hydrochloric acid and the solution is basified with caustic soda. The base which is liberated is extracted with chloroform and the chloroform solution is evaporated to dryness. The residue is extracted with 400 parts of 5% aqueous acetic acid and the base is again liberated from the extract by addition of caustic soda solution and then extracted with ether. The ether solution is dried over anhydrous sodium sulphate and the ether is distilled off. 2-p-chloroanilino-4-β - diethylaminoethylamino - 5:6:7:8 - tetrahydroquinazoline remains. It may be purified by crystallisation from petroleum ether, from which it separates in colourless prisms of M. P. 132°–134° C.

The dihydrochloride can readily be made in the usual manner and when crystallised from a mixture of ethanol and ethyl acetate has M. P. 224°–226° C.

In a similar way, from the same chloro-compound and γ-dimethylaminopropylamine there is obtained 2-p-chloroanilino-4-γ-dimethylaminopropylamino - 5:6:7:8 - tetrahydroquinazoline which crystallises from petroleum ether (B. P. 110°–120° C.) in the form of colourless flat prisms of M. P. 125°–127° C. The dihydrochloride, crystallised from a mixture of ethanol and ethyl acetate, has M. P. 290° C. (decomp.).

Again, from the same chloro-compound and γ-diethylaminopropylamine there is obtained 2-p-chloroanilino - 4 - γ - diethylaminopropylamino-5:6:7:8-tetrahydroquinazoline which crystallises from petroleum ether (B. P. 100°–120° C.) in colourless flat prisms of M. P. 138°–140° C. The dihydrochloride, when crystallised from a mixture of ethanol and ethyl acetate, has M. P. 202°–204° C.

*Example 18*

5 parts of 2-chloro-4-p-chloroanilino-6-methylpyrimidine and 3.2 parts of γ-diethylaminopropylamine are heated together at 120°–130° C. for 8 hours. The reaction mixture is cooled somewhat and dissolved in hot dilute hydrochloric acid. The solution is cooled and basified with caustic soda and the base which is liberated is extracted with chloroform. The chloroform solution is twice extracted with 5% aqueous acetic acid, the acid extracts are combined and basified with caustic soda and the base is again extracted with chloroform. The chloroform solution is dried and the chloroform is distilled off. The oily residue is the base, 2-γ-diethylaminopropylamino-4-p-chloroanilino-6-methylpyrimidine. It readily forms a picrate which crystallises from β-ethoxyethanol and melts at 212°–213° C.

The base may be converted to the dihydrochloride by dissolving it in hot 2-normal hydrochloric acid and cooling the solution. The hydrochloride separates out and is filtered off, washed with acetone and dried. There is thus obtained 2-γ-diethylaminopropylamino-4-p-chloroanilino-6-methylpyrimidine dihydrochloride which may be crystallised from a mixture of methyl alcohol and ethyl acetate and then has M. P. 268°–270° C.

*Example 19*

11.4 parts of 2-p-chloroanilino-4-chloro-5:6-dimethyl-pyrimidine and 5.5 parts of γ-dimethylaminopropylamine are stirred and heated together at 125°–135° C. for 8 hours. The melt is cooled and dissolved in dilute hydrochloric acid and the solution is made alkaline by addition of caustic soda solution. The crude base which is liberated is extracted with chloroform and the chloroform solution is evaporated to dryness. The residue is extracted with 400 parts of 5% aqueous acetic acid and the base is again liberated by addition of caustic soda solution and extracted with chloroform. The chloroform solution is dried over anhydrous sodium sulphate and the chloroform is distilled off. 2-p-chloroanilino-4-γ-dimethylaminopropylamino-5:6 - dimethylpyrimidine remains. After crystallisation from petroleum ether (B. P. 60–80° C.) it has M. P. 116°–118° C. The dihydrochloride, crystallised from ethanol, has M. P. 238°–240° C.

In a similar way from 2-p-chloroanilino-4-chloro - 5 - ethyl - 6 - methylpyrimidine and 2 - amino-5-diethylaminopentane there is obtained 2-p-chloroanilino-4-δ-diethylamino - α - methylbutylamino-5-ethyl-6-methyl-pyrimidine, which is an oil. The dihydrochloride, obtained in the usual manner and purified by crystallisation from a mixture of ethanol and ethyl acetate has M. P. 231°–233° C.

Example 20

12.7 parts of 2-p-chloroanilino-4-chloro-6-methylpyrimidine and 8.1 parts of β-diethylaminoethyl methylamine are heated together for 8 hours at 120°–130° C. The reaction mixture is dissolved in hot dilute hydrochloric acid. The solution is filtered, cooled and basified with caustic soda solution and the base is extracted with chloroform. The chloroform solution is extracted twice with 5% aqueous acetic acid, the acid extract is basified with caustic soda, and the base is again extracted with chloroform. The solution is dried and the solvent is distilled off. The residual oil is the base, 2-p-chloroanilino-4-(β-diethylaminoethyl-methylamino)-6-methylpyrimidine. It forms a picrate which crystallises from β-ethoxyethanol with M. P. 204–206° C.

The base is converted to the hydrochloride by dissolving in 2-normal hydrochloric acid and evaporating to dryness in vacuo. After drying, the 2-p-chloroanilino-4-(β-diethylaminoethyl-methylamino)-6-methylpyrimidine dihydrochloride is crystallised from a mixture of alcohol and ethyl acetate; it has M. P. 257°–258° C.

Example 21

13.94 parts of 4-chloro-2(6'-bromo-2'-naphthylamino)-6-methylpyrimidine and 8.95 parts of 3-di-n-butylamino-propylamine are heated together with stirring at 120°–130° C. for 6 hours. After cooling, water and sufficient caustic soda to make the mixture alkaline are added and the mixture is stirred with chloroform until all is dissolved either in the water or in the chloroform. The chloroform layer is then separated and the chloroform is distilled off. The residue is extracted with 200 parts of 5% acetic acid and the extract is shaken twice with ether, the ether extracts being discarded. On the addition of 50 parts of concentrated hydrochloric acid to the acetic acid solution, 4-γ-di-n-butylaminopropylamino-2-(6'-bromo-2'-naphthylamino)-6-methylpyrimidine dihydrochloride is precipitated in a crystalline condition. It is filtered off, washed first with 2-normal hydrochloric acid and then with acetone. After drying at 60–65° C. it is further purified by crystallisation from a mixture of ethanol and ethyl acetate when it is obtained as colourless needles, M. P. 230°–232° C. (with effervescence).

Example 22

12.7 parts of 4-chloro-2-p-chloroanilino-6-methylpyrimidine and 11.6 parts of γ-di-n-butylamino-propylamine are stirred and heated together at 125°–135° C. for 8 hours. The reaction mixture is dissolved in warm dilute hydrochloric acid and the solution is basified with caustic soda while still warm. The base which is precipitated is extracted with chloroform and the chloroform solution is dried over potassium carbonate. The chloroform is then distilled off and the residual oil is distilled in vacuo. The fraction of B. P. 224°–228° C./0.04 mm. is collected and consists of 4-γ-di-n-butylaminopropylamino-2-p-chloroanilino-6-methylpyrimidine.

For conversion to the hydrochloride the base is dissolved in warm dilute hydrochloric acid and to the solution an excess of concentrated hydrochloric acid is added. The hydrochloride is precipitated and is filtered off, dried and crystallised from a mixture of ethanol and ethyl acetate. It is thus obtained in the form of the dihydrate which possesses no sharp melting point; it softens at about 120° C. and finally melts at 154°–164° C.

Example 23

12.7 parts of 2-p-chloroanilino-4-chloro-6-methylpyrimidine and 8 parts of β-piperidinoethylamine are heated together for 8 hours at 120°–130° C. The reaction mixture is cooled, dissolved in hot dilute hydrochloric acid and basified with caustic soda solution. The base which is liberated is extracted with ether, the ether solution is in turn extracted with 5% acetic acid and the acid extract is basified with caustic soda solution. The base is then extracted with chloroform, the solution is dried and the solvent is distilled off. 2-p-chloroanilino-4-β-piperidinoethylamino-6-methylpyrimidine remains. It is an oil; it forms a picrate which, crystallised from β-ethoxy-ethanol, has M. P. 230°–231° C. The dihydrochloride is obtained by dissolving the base in hot 2-normal hydrochloric acid; the hydrochloride crystallises out on cooling. It is filtered off, washed with acetone and dried, and then crystallised from alcohol. It then has M. P. 288°–290° C.

In a similar manner from the same chloro-compound and the appropriate diamine there are obtained 2-p-chloro-anilino-4-β-pyrrolidinoethylamino-6-methylpyrimidine dihydrochloride, M. P. 280°–282° C., and 2-p-chloroanilino-4-β-piperidino-α-methylethylamino-6-methylpyrimidine dihydrochloride, M. P. 254°–256° C.

Example 24

12.7 parts of 2-p-chloroanilino-4-chloro-6-methylpyrimidine and 10.9 parts of γ-(β-diethylaminoethoxy)-propylamine are heated together for 8 hours at 120°–130° C. The reaction mixture is then dissolved in hot dilute hydrochloric acid, cooled and basified with caustic soda solution. The base which is liberated is extracted with chloroform, the chloroform solution is in turn extracted with aqueous 5% acetic acid and the acid extract is basified with caustic soda solution. The base is again extracted with chloroform, the solution is dried and the chloroform is distilled off. The oil remaining is 2-p-chloroanilino-4-γ-(β-diethylaminoethoxy)-propylamino-6-methylpyrimidine. It forms a picrate which when crystallised from a mixture of β-ethoxyethanol and ethanol has M. P. 142°–144° C.

The dihydrochloride is made by dissolving the base in 2-normal hydrochloric acid and evaporating the solution to dryness in vacuo. After drying it is crystallised from a mixture of ethyl alcohol and ethyl acetate and then has M. P. 192°–193° C.

In a similar manner, from the same chloro-compound and N-methyl-N-β-diethylaminoethyl-trimethylenediamine there is obtained 2-p-chloroanilino-4-γ-(N-methyl-N-β-diethylaminoethyl-amino)-propylamino-6-methylpyrimidine. The picrate has M. P. 206°–208° C. and the trihydrochloride, made by dissolving the base in 2-normal hydrochloric acid, evaporating to dryness and crystallising the residue from ethanol, has M. P. 234°–236° C.

Similarly from the same chloro-compound and bis-(β-diethylaminoethyl)-amine there is obtained 2-p-chloroanilino-4-bis-(β-diethylaminoethyl)-amino-6-methylpyrimidine. The picrate has M. P. 192°–194° C. and the trihydriodide, made by dissolving the base in alcohol, acidifying with aqueous 55% hydriodic acid, evaporating to dryness in vacuo and crystallising from ethanol has M. P. 241°–243° C.

Again from the same chloro-compound and bis- (diethylaminomethyl)-methylamine there is obtained 2-p-chloroanilino - 4 -(bis-diethylaminomethyl-methylamino)-6-methylpyrimidine. The picrate has M. P. 181°–183° C. and the trihydriodide M. P. 240°–241° C.

By working in accordance with the methods described above the following further compounds are obtained, namely:

Example 25.—2-β-diethylaminoethylamino-4-p-chloroanilino - 6 - methylpyrimidine, M. P. 96°–97° C.

Example 26.—2-γ-piperidinopropylamino-4-p-chloroanilino-6-methylpyrimidine dihydrochloride, M. P. 278°–280° C.

Example 27.—2-γ-dimethylaminopropylamino-4-p-chloroanilino-6-methylpyrimidine dihydrochloride, M. P. 270° C.

Example 28.—2-β-diethylaminoethylamino-4-p-methoxyanilino-6-methylpyrimidine dihydrochloride, M. P. 216°–218° C.

Example 29.—2-β-diethylaminoethylamino-4-p - methylanilino - 6 - methylpyrimidine, M. P. 66°–68° C.

Example 30.—2-δ-diethylaminobutylamino-4-p - chloroanilino - 6 - methylpyrimidine dihydrochloride, M. P. 197°–198° C.

Example 31.—2-δ-diethylamino-α-methylbutylamino-4-p-chloroanilino-6-methylpyrimidine dihydrobromide, M. P. 200°–201° C.

Example 32.—2-γ-N-methyl-N-isopropylaminopropylamino -4-p-chloroanilino-6-methylpyrimidine dihydrochloride, M. P. 274°–276° C.

Example 33.—2 -γ- dibutylaminopropylamino-4-p-chloroanilino-6-methylpyrimidine dihydrochloride, M. P. 171°–173° C.

Example 34.—2 -δ- dimethylaminobutylamino-4 - p - chloroanilino - 6 - methylpyrimidine, M. P. 156°–158° C.

Example 35.—2 -γ- butylaminopropylamino-4-p - chloroanilino - 6 - methylpyrimidine dihydrochloride, M. P. 301°–303° C.

Example 36.—2-δ-dibutylaminobutylamino-4-p - chloroanilino - 6 - methylpyrimidine dihydrochloride, M. P. 125°–127° C.

Example 37.—2-p-chloroanilino-4-γ-N-methyl-N - isopropylaminopropylamino-6-methylpyrimidine dihydrochloride, M. P. 251°–252° C.

Example 38.—2-γ-dibutylaminopropylamino-4-p-chloroanilino-5:6-dimethylpyrimidine dihydrochloride, M. P. 204°–205° C.

Example 39.—2-p-chloroanilino-4-γ-dimethylaminopropylamino- 5:6 -trimethylenepyrimidine, M. P. 142°–144° C.

Example 40.—2-β-diethylaminoethylamino-4-p - nitroanilino - 6 - methylpyrimidine, M. P. 160°–161° C.

Example 41.—2 - γ - piperidinopropylamino-4-p - nitroanilino - 6 - methylpyrimidine, M. P. 174°–175° C.

Example 42.—2 -γ- dibutylaminopropylamino-4 - p - nitroanilino - 6 - methylpyrimidine, M. P. 118°–119° C.

Example 43.—2 -γ- diethylaminopropylamino-4 - p - chloroanilino-5-nitro-6-methylpyrimidine, M. P. 109°–110° C.

Example 44.—2-γ-N-methyl-N-isopropylaminopropylamino - 4-p-chloroanilino-5-nitro-6-methylpyrimidine, M. P. 96°–98° C.

Example 45.—2 -γ- dibutylaminopropylamino-4-p-chloroanilino-5-nitro - 6 - methylpyrimidine, M. P. 76°–78° C.

Example 46.—2-γ-dimethylaminopropylamino-4-p-chloroanilino-5-nitro - 6 - methylpyrimidine, M. P. 122°–124° C.

Example 47.—2-p-chloroanilino - 4 -β-diethylaminoethylamino-5-nitro - 6 - methylpyrimidine, M. P. 146°–148° C. and Example 48.—2-p-chloroanilino - 4 -γ-diethylaminopropylamino-5-nitro - 6 - methylpyrimidine, M. P. 94°–96° C.

Whereas the above description and examples illustrate many widely varied embodiments of the invention it will be apparent to one skilled in the art that many other embodiments and variations may be devised without departing from the spirit and scope thereof and accordingly it is to be understood that the invention is not in any way limited except as defined in the following claims.

In the claims below the expression "lower alkyl" shall be understood as referring to an alkyl radical having not more than 6 carbon atoms, but which may be otherwise straight-chained or branched-chained. The expression "N-radical" when referring to an amine or nitrogenous base means the radical obtained by removing one of the hydrogens (or the only hydrogen) from the N-atom of the specified amine or base. The expression "acidic substituents" refers to radicals commonly recognized as ionizable, salt-forming, acid radicals.

We claim:

1. A compound selected from the group consisting of the free base form, salts and tautomers of the pyrimidine derivatives which in form of free base correspond to the following formula

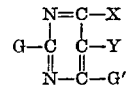

where X stands for a member of the group consisting of hydrogen, lower alkyl and phenyl; Y is a member selected from the group consisting of hydrogen, lower alkyl, phenyl, benzyl, phenoxy, halogen and nitro; one of the members G and G' is the N-radical of an aromatic amine which contains not more than 10 C-atoms in its cyclic skeleton and whose cyclic carbon atoms have their extranuclear valencies satisfied by attachment to members selected from the group consisting of hydrogen, halogen, lower alkyl, alkoxy, alkyl-thio, alkylamino, carbomethoxy, phenyl, nitro and cyano; while the other of said members G and G' represents a strongly basic radical of the form

wherein R" stands for a member of the group consisting of hydrogen and methyl, Q is the N-radical of a nitrogenous base selected from the group consisting of lower monoalkyl-amines, lower dialkyl amines, piperidine and pyrrolidine, while A is a divalent, saturated, aliphatic radical which interposes between Q and N not less than 2 and not more than 5 carbon atoms and which has one of the forms: alk, alk—O—alk,

and

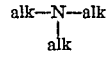

"alk" being a lower alkyl radical.

2. A compound selected from the group consisting of the free base form, salts and tautomers of the pyrimidine derivatives which in form of free base correspond to the following formula

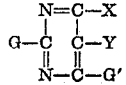

where X stands for a member of the group consisting of hydrogen, lower alkyl and phenyl; Y is a member selected from the group consisting of hydrogen, lower alkyl, phenyl, benzyl, phenoxy, halogen and nitro; one of the members G and G' is the N-radical of an aromatic amine which contains not more than 10 C-atoms in its cyclic skeleton and whose cyclic carbon atoms have their extranuclear valencies satisfied by attachment to members selected from the group consisting of hydrogen, halogen, lower alkyl, alkoxy, alkyl-thio, alkylamino, carbomethoxy, phenyl, nitro and cyano; while the other of said members G and G' represents a strongly basic radical of the form

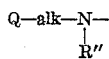

wherein R'' stands for a member of the group consisting of hydrogen and methyl, Q is the N-radical of a nitrogenous base selected from the group consisting of lower monoalkyl-amines, lower dialkyl amines, piperidine and pyrrolidine, while alk stands for a saturated aliphatic hydrocarbon radical having not less than 2 and not more than 5 carbon atoms.

3. A compound selected from the group consisting of the free base form, salts and tautomers of the pyrimidine derivatives which in form of free base correspond to the following formula

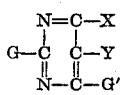

where X stands for a member of the group consisting of hydrogen, lower alkyl and phenyl; Y is a member selected from the group consisting of hydrogen, lower alkyl, phenyl, benzyl, phenoxy, halogen and nitro; one of the members G and G' is the N-radical of an aromatic amine which contains not more than 10 C-atoms in its cyclic skeleton and whose cyclic carbon atoms have their extranuclear valencies satisfied by attachment to members selected from the group consisting of hydrogen, halogen, lower alkyl, alkoxy, alkyl-thio, alkylamino, carbomethoxy, phenyl, nitro and cyano; while the other of said members G and G' represents a strongly basic radical of the form

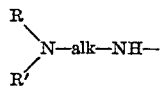

wherein R and R' are lower alkyl radicals, while alk stands for a saturated aliphatic hydrocarbon radical having not less than 2 and not more than 5 carbon atoms.

4. A compound selected from the group consisting of the free base form, salts and tautomers of the pyrimidine derivatives which in form of free base correspond to the following formula

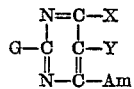

where X stands for a member of the group consisting of hydrogen, lower alkyl and phenyl; Y is a member selected from the group consisting of hydrogen, lower alkyl, phenyl, benzyl, phenoxy, halogen and nitro; Am is the N-radical of an aromatic amine which contains not more than 10 C-atoms in its cyclic skeleton and whose cyclic carbon atoms have their extranuclear valencies satisfied by attachment to members selected from the group consisting of hydrogen, halogen, lower alkyl, alkoxy, alkyl-thio, alkylamino, carbomethoxy, phenyl, nitro and cyano; while G represents a strongly basic radical of the form

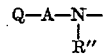

wherein R'' stands for a member of the group consisting of hydrogen and methyl, Q is the N-radical of a nitrogenous base selected from the group consisting of lower monoalkyl-amines, lower dialkyl amines, piperidine and pyrrolidine, while A is a divalent, saturated, aliphatic radical which interposes between Q and N not less than 2 and not more than 5 carbon atoms and which has one of the forms: alk, alk—O—alk,

and

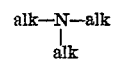

"alk" being a lower alkyl radical.

5. A compound selected from the group consisting of the free base form, salts and tautomers of the pyrimidine derivatives which in form of free base correspond to the following formula

where X stands for a member of the group consisting of hydrogen, lower alkyl and phenyl; Y is a member selected from the group consisting of hydrogen, lower alkyl, phenyl, benzyl, phenoxy, halogen and nitro; Am is the N-radical of an aromatic amine which contains not more than 10 C-atoms in its cyclic skeleton and whose cyclic carbon atoms have their extranuclear valencies satisfied by attachment to members selected from the group consisting of hydrogen, halogen, lower alkyl, alkoxy, alkyl-thio, alkylamino, carbomethoxy, phenyl, nitro and cyano; while G represents a strongly basic radical of the form

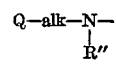

wherein R'' stands for a member of the group consisting of hydrogen and methyl, Q is the N-radical of a nitrogenous base selected from the group consisting of lower monoalkyl-amines, lower dialkyl amines, piperidine and pyrrolidine, while alk stands for a saturated aliphatic hydrocarbon radical having not less than 2 and not more than 5 carbon atoms.

6. A compound selected from the group consisting of the free base form, salts and tautomers of the pyrimidine derivatives which in form of free base correspond to the following formula

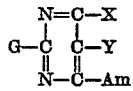

where X stands for a member of the group consisting of hydrogen, lower alkyl and phenyl; Y is a member selected from the group consisting of hydrogen, lower alkyl, phenyl, benzyl, phenoxy, halogen and nitro; Am is the N-radical of an aromatic amine which contains not more than 10 C-atoms in its cyclic skeleton and whose cyclic carbon atoms have their extranuclear valencies satisfied by attachment to members selected from the group consisting of hydrogen, halogen, lower alkyl, alkoxy, alkyl-thio, alkylamino, carbomethoxy, phenyl, nitro and cyano; while G represents a strongly basic radical of the form

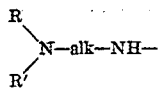

wherein R and R' are lower alkyl radicals, while alk stands for a saturated aliphatic hydrocarbon radical having not less than 2 and not more than 5 carbon atoms.

7. A compound selected from the group consisting of the free base forms, salts and tautomers of the pyrimidine derivatives which in form of free base correspond to the following formula

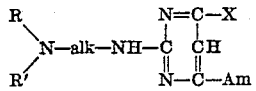

wherein X stands for a member of the group consisting of hydrogen, lower alkyl and phenyl; Am is the N-radical of an aromatic amine which contains not more than 10 C-atoms in its cyclic skeleton and whose cyclic carbon atoms have their extranuclear valencies satisfied by attachment to members selected from the group consisting of hydrogen, halogen, lower alkyl, alkoxy, alkyl-thio, alkylamino, carbomethoxy, phenyl, nitro and cyano; R and R' are lower alkyl radicals, while alk stands for a saturated alpihatic hydrocarbon radical having not less than 2 and not more than 5 carbon atoms.

8. A compound selected from the group consisting of the free base form, salts and tautomers of the pyrimidine derivatives which in form of free base correspond to the following formula

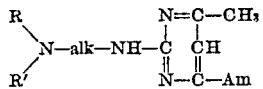

wherein Am is the N-radical of an aromatic amine which contains not more than 10 C-atoms in its cyclic skeleton and whose cyclic carbon atoms have their extranuclear valencies satisfied by attachment to members selected from the group consisting of hydrogen, halogen, lower alkyl, alkoxy, alkyl-thio, alkylamino, carbomethoxy, phenyl, nitro and cyano; R and R' are lower alkyl radicals, while alk stands for a saturated aliphatic hydrocarbon radical having not less than 2 and not more than 5 carbon atoms.

9. As new pyrimidine compounds the 2-dialkylamino-alkylamino-6-methylpyrimidines bearing in the 4-position an arylamino radical devoid of acidic substituents.

10. As new compounds the 4-p-halogenoanilino-6-methyl-2-dialkylaminoalkylaminopyrimidines.

11. As a new compound 2-γ-dibutylaminopropylamino-4-p-chloroanilino-6-methylpyrimidine.

12. As a new compound 2-γ-piperidinopropylamino-4-p-chloroanilino-6-methylpyrimidine.

13. As a new compound 2-γ-piperidinopropylamino-4-p-nitroanilino-6-methylpyrimidine.

14. A process for producing the organic compounds defined in claim 1, which comprises reacting a diamine of formula Q—A—NHR'', wherein Q, R'' and A have the same significance as in claim 1, with a pyrimidine derivative as therein defined except that it carries a labile group in lieu of the substituent G.

15. A process for producing the organic compounds defined in claim 5, which comprises reacting a diamine of formula Q—alk—NHR'', wherein Q, R'' and alk have the same significance as in claim 5, with a pyrimidine derivative as therein defined except that it carries a halogen atom in position 2, in lieu of the substituent G therein indicated.

16. A process for producing the organic compounds defined in claim 7, which comprises reacting a dialkylamino-alkylamine with a 2-chloro-pyrimidine bearing in the 4-position an arylamino radical as defined in claim 7 and in the 6-position a substituent X as therein defined.

FRANCIS HENRY SWINDEN CURD.
CLIFFORD GORDON RAISON.
FRANCIS LESLIE ROSE.